United States Patent [19]
Cleveland

[11] Patent Number: 5,446,462
[45] Date of Patent: Aug. 29, 1995

[54] EXTREMELY HIGH FREQUENCY VEHICLE IDENTIFICATION AND COMMUNICATION SYSTEM

[75] Inventor: Austin R. Cleveland, Gilbert, Ariz.

[73] Assignee: E-Systems, Inc., Dallas, Tex.

[21] Appl. No.: 4,617

[22] Filed: Jan. 14, 1993

[51] Int. Cl.6 .............................................. G01S 13/79
[52] U.S. Cl. ......................................... 342/45; 342/82
[58] Field of Search ............................... 342/45, 60, 82

[56] References Cited

U.S. PATENT DOCUMENTS

| | | | |
|---|---|---|---|
| 3,683,374 | 8/1972 | Honold | 342/43 X |
| 3,984,835 | 10/1976 | Kaplan et al. | 342/44 |
| 4,109,247 | 8/1978 | Kaplan | 342/50 |
| 4,144,534 | 3/1979 | Prickett et al. | 342/43 |
| 4,193,073 | 3/1980 | Kohnen | 342/56 |
| 4,249,265 | 2/1981 | Coster | 342/45 |
| 4,361,911 | 11/1982 | Buser et al. | 342/45 X |
| 4,566,009 | 1/1986 | Hanni et al. | 342/45 |
| 4,633,251 | 12/1986 | McGeoch et al. | 342/44 |
| 4,658,359 | 4/1987 | Palatucci et al. | 364/424 |
| 4,694,297 | 9/1987 | Sewards | 342/45 |
| 4,755,772 | 7/1988 | Khanna | 331/109 |
| 4,761,813 | 8/1988 | Gammel | 380/6 |
| 4,837,575 | 6/1989 | Conner, Jr. | 342/45 |
| 5,001,488 | 3/1991 | Joguet | 342/45 |
| 5,170,168 | 12/1992 | Roth | 342/45 |
| 5,379,043 | 1/1995 | Bishop | 342/45 |

*Primary Examiner*—John B. Sotomayor
*Attorney, Agent, or Firm*—Harold E. Meier

[57] ABSTRACT

Apparatus and method for allowing ground vehicle identification and communication utilizing IFF equipment consisting of a multi-channel extremely high frequency transmitter for IFF and data transmissions and a receiver for multi-frequency conversions and multi-channel reception. The apparatus and method has both an IFF mode of operation in which the vehicle is able to identify itself and a communications mode in which the vehicle transmits vehicle status information to other vehicles and a command unit. The transmitter comprises a first and second oscillator means for generating a number of frequency tones and a power combiner for combining the tones prior to transmission. A controller monitors the transmitted signal and operates the first and second oscillation means. The receiver consists of a channelizer for separating a received signal into separate frequency tones and a measuring means for determining the values of the frequency tones. A controller controls the comparison or decoding of received signals.

16 Claims, 9 Drawing Sheets

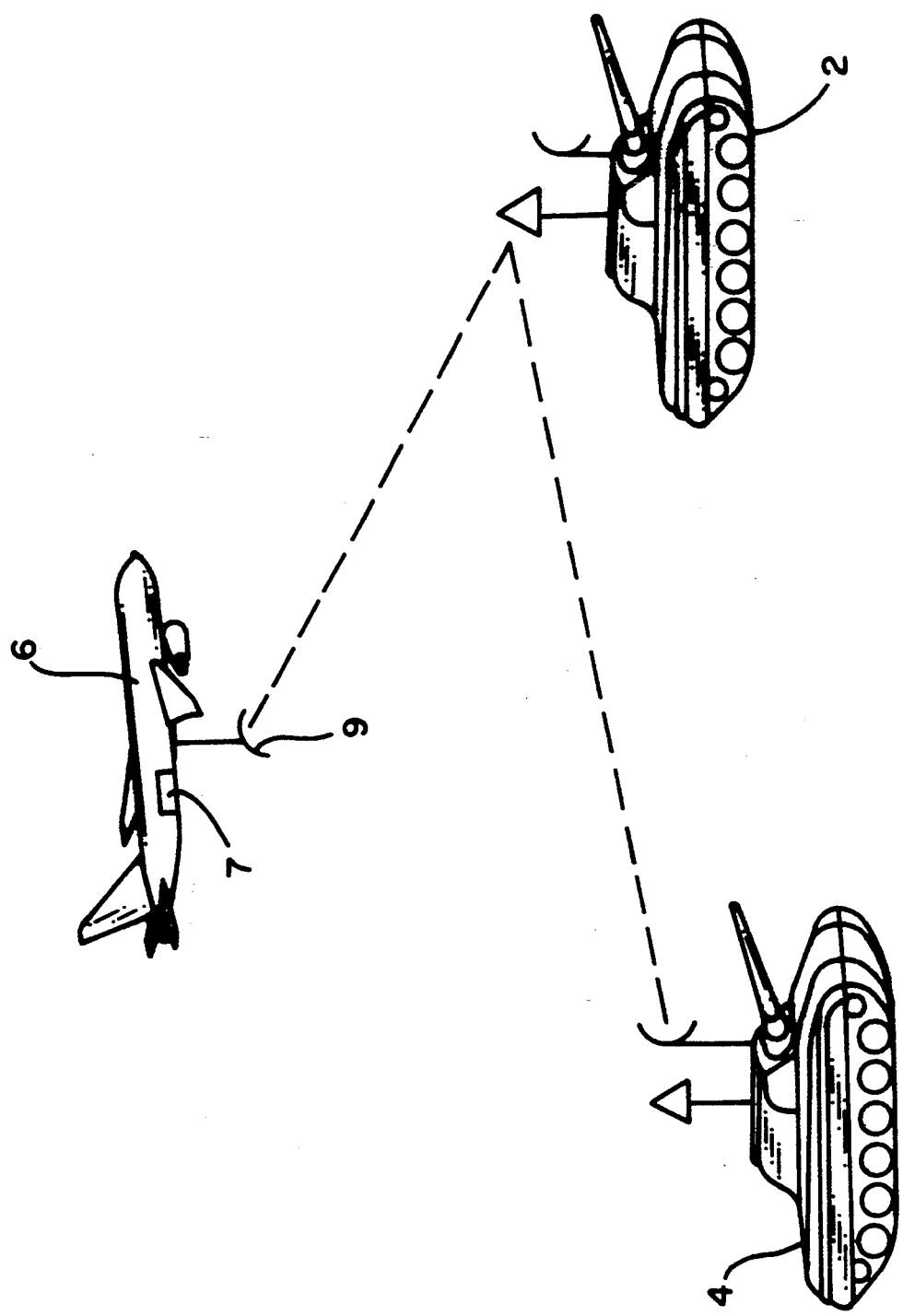

EXTREMELY HIGH FREQUENCY VEHICLE IDENTIFICATION AND COMMUNICATION SYSTEM

TECHNICAL FIELD

This invention relates to identification and communication systems, and more particularly to the use of a communications system for both identification and communications.

BACKGROUND OF THE INVENTION

Identification friend or foe (IFF) systems have been primarily related to air surveillance radar and transponder systems. However, it has recently been recognized that there is a need for battlefield identification equipment for ground vehicles. The need for such equipment is made imperative by the problem of discrimination between enemy and friend which is fundamental to every type of conflict including battlefield warfare. The conventional IFF approach used with air surveillance radar is inappropriate for battlefield conditions since the approach requires a complex L-band transmitter and antenna system, is overly sophisticated for the battlefield environment, and would be extremely difficult to reduce in size, weight, and cost to make the system feasible to use with ground vehicles.

Various identification systems have been proposed. However, these identification systems tend to suffer serious drawbacks. One identification system requires an interrogator to transmit a relatively low radio frequency (RF) signal to which a friendly target responds by transmitting another RF signal. But, such low frequency RF signals may be easily received by an enemy as well as friends. This system potentially identifies the interrogator and the position of the interrogator to enemy forces capable of receiving the transmitted RF signal of the interrogator.

In other identification systems, targets reply to an interrogation by transmitting relatively long, secret codes. However, such reply codes are often relatively easy to detect by an enemy and are susceptible to jamming. Additionally, if the codes are known in advance, an enemy may be able to exploit the identification system.

Another type of proposed IFF system utilizes optical identification such as lasers or infrared cameras to identify targets. Such systems, however, are limited to line-of-sight operation, and system performance can be highly degraded by inclement weather or smoke. These conditions are likely to arise in a battlefield environment.

The application of conventional time division multiple access (TDMA) networks to ground vehicles suffer from the same problems as applying IFF systems to ground vehicles. The systems normally operate in the L-band which makes detection by an enemy fairly easy. Also, presently existing TDMA systems require the use of high accuracy clocks which are synchronized to an absolute time within a micro second or two. These type of clocks are extremely expensive and not practical for use on many types of ground vehicles.

Thus, a need has arisen for a communications system having an IFF in addition to a data communications mode. The system should be adaptable to ground vehicles and not susceptible to enemy detection.

SUMMARY OF THE INVENTION

The present invention overcomes the foregoing and other problems by a system combining IFF and communications capabilities. The system utilizes a multi-channel extremely high frequency transmitter operating in either an IFF mode or a communications mode. In the IFF mode, an oscillator as a part of the transmitter generates an IFF response signal in accordance with the IFF code of the day. The oscillator signal is transmitted from the unit by means of an omni-directional antenna. Control means within the transmitter monitors the output signal to determine if the proper signal is being transmitted. The broad antenna pattern and low power level of the transmitter allow the transmitter to have a low effective radiated power (ERP). This low value of ERP, together with the uncertainty in each of the channel frequencies, results in a transmitted signal that has a low probability of intercept.

In the data transmission mode, the transmitter operates in substantially the same manner except that vehicle status data is transmitted and transmitter chip rates are increased to allow more data to be transmitted in a single time slot.

The receiver of the present invention is a frequency swept multi-channel receiver capable of receiving IFF coded signals and breaking a received signal down into coded tone frequencies representing the IFF code. After the signal is broken down into the coded tone frequencies, the code tone frequencies are compared to a preselected code to determine if the target is a friend or foe. In the data reception mode, the receiver sweep rate is increased to match the increase in the transmitter chip rate. Received data signals are then processed for analysis by a command unit.

The data transmission mode of the present system does not require the use of high accuracy clocks to operate but utilizes a relative time slot system to provide operational time slots to members of the network. The TDMA network optimally operates utilizing an airborne relay station but may function within a limited line-of-sight area for transmitting data between adjacent ground vehicles.

BRIEF DESCRIPTION OF THE DRAWINGS

For a more complete understanding of the present invention and the advantages thereof, reference is now made to the following detailed description taken in conjunction with the accompanying drawings in which:

FIGS. 1A and 1B are illustrations of the operation of an IFF mode and a communication mode in accordance with the present invention;

DETAILED DESCRIPTION OF THE INVENTION

Referring now to FIG. 1A, there is shown an illustration of the system of the present invention operating in the IFF mode. In the IFF mode, each friendly attacking and target designation element is equipped with a receiving subsystem to receive and decode the IFF transmissions of the ground vehicle 2 being considered as a potential target. The antenna pattern of the ground vehicle 2 is essentially onmidirectional. The antenna pattern of the target designator or attacking element is a narrow beam pattern allowing target discrimination. In the IFF mode, the ground vehicle 2 transmits the IFF code of the day such that the code is received by other ground vehicles 4 or air units 6. The unit receiving the signal determines if the proper IFF code has been received by comparing the code to a code stored in memory. The receiving unit then displays an indication of whether the transmitting target is a friend or foe.

Figure 1B:
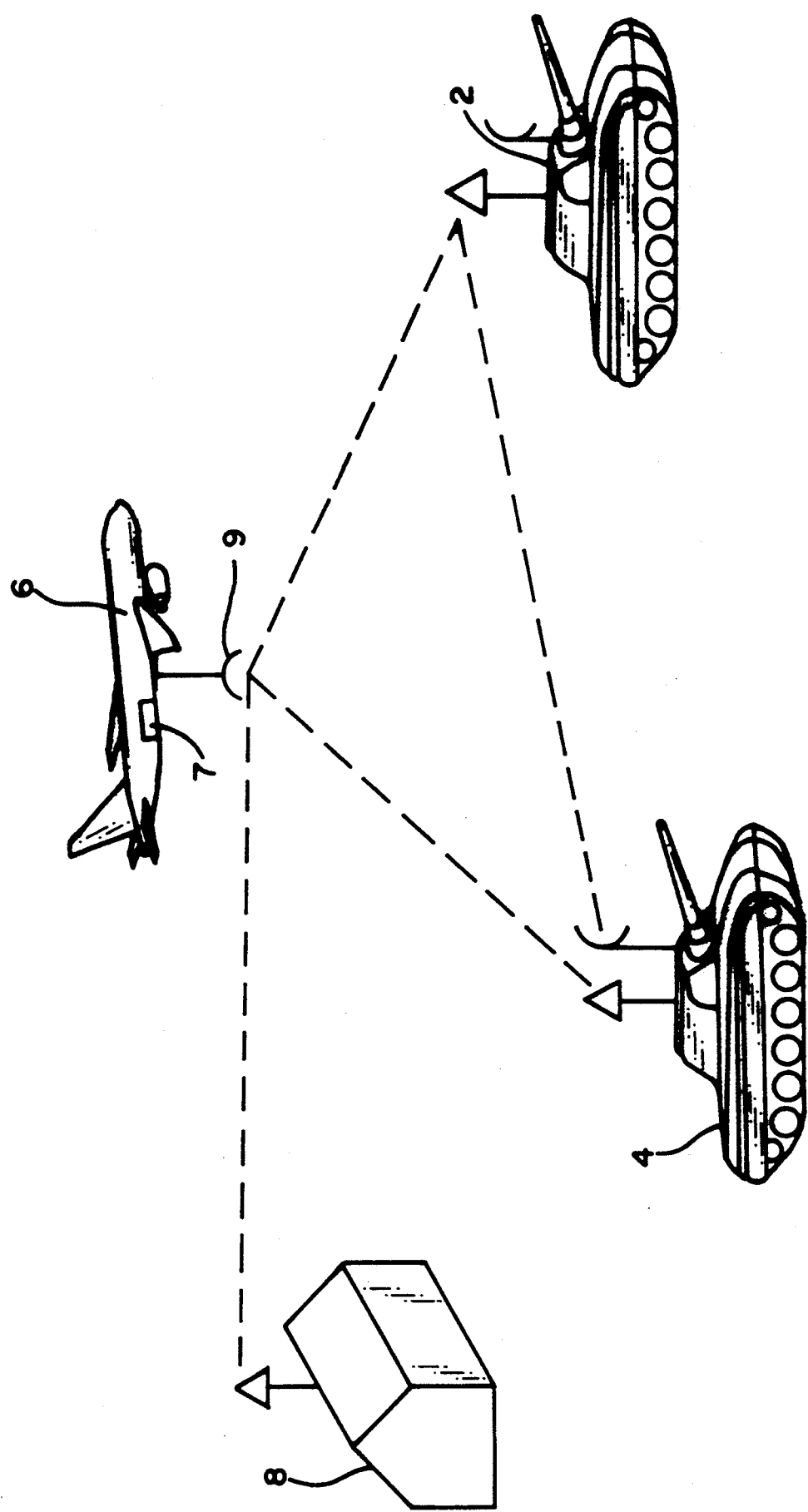

Referring now to FIG. 1B, there is illustrated the present invention operating in the communications mode. In the communication mode, transmission between the ground units can be carried out in one of two fashions. In one embodiment, the communication is direct and similar to the IFF mode. One ground unit 2, subject to line-of-sight limitations, transmits data directly to another ground unit 4. In the other embodiment, transmission between the ground units (2 or 4) or between a ground unit 4 and a command unit 8 is as shown in FIG. 1B. The data is transmitted to an airborne relay unit 6 such as an aircraft or helicopter during a time slot allotted to the transmitting ground unit (2 or 4). The airborne relay unit scans the battlefield in a systematic manner with a mechanically or electrically scanned antenna 9. The data is received and stored in an on-board processor 7 in the airborne relay unit 6 until the next time slot allocated for reception by the designated receiving element. In a similar manner the command unit 8 can address and transmit data to any ground vehicle (2 or 4).

Figure 2:
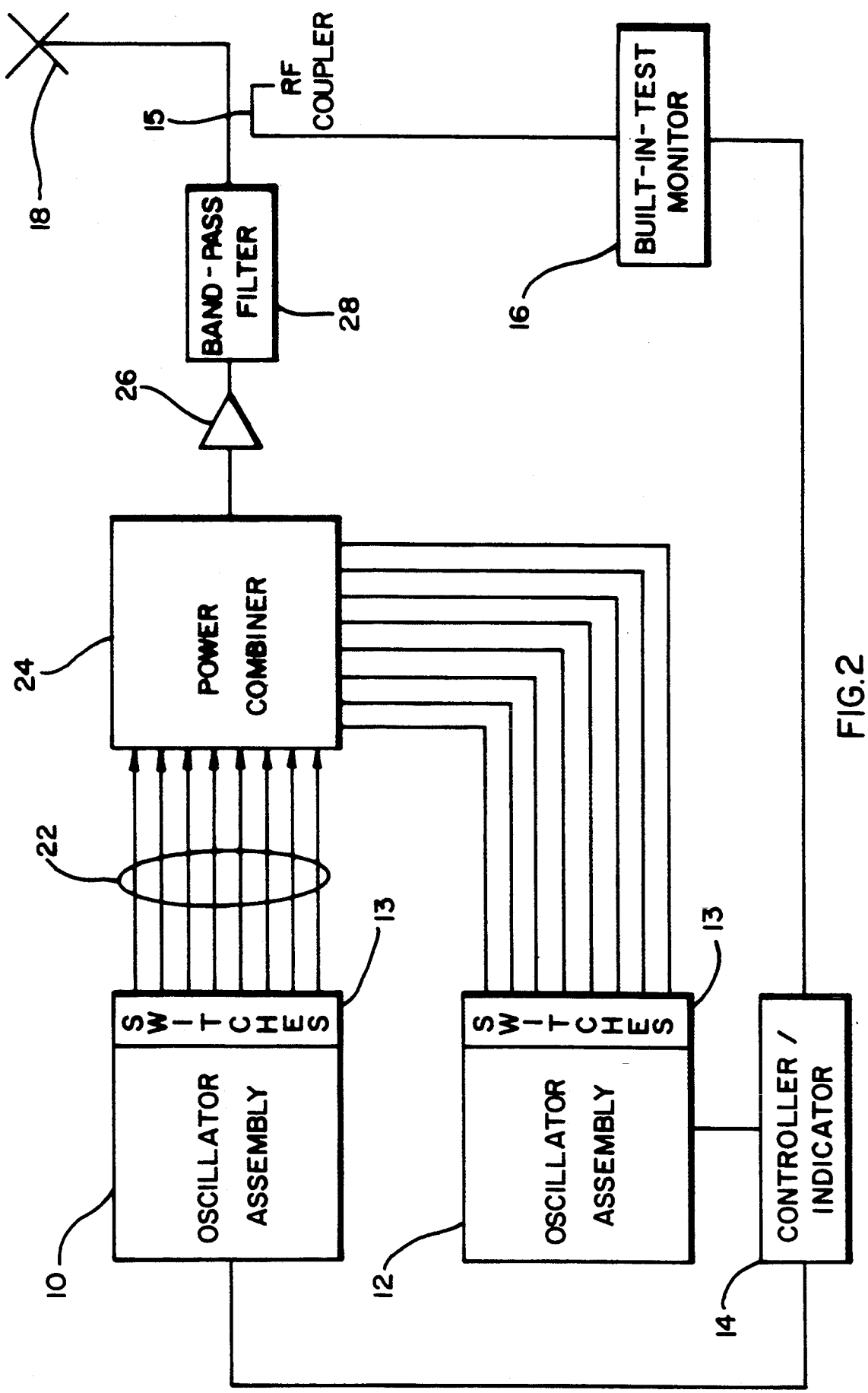
FIG. 2 is a block diagram illustrating one embodiment of a transmitter of the present invention.

Referring now to FIG. 2, there is shown a block diagram illustrating an extremely high frequency (EHF) transmitter used by the present invention. The transmitter has two dielectric resonator oscillator assemblies (10 and 12) each containing eight oscillators of conventional design. The IFF dielectric resonator oscillator assembly 10 generates the frequency tones corresponding to the correct IFF signal code to be sent by the transmitter. The communication dielectric resonator oscillator assembly 12 generates the frequency tones representing the data to be transmitted to the command unit 8 via the relay unit 6. Transmitted data normally includes such vehicle status information as specific vehicle identification, vehicle condition, fuel and armament status, location, and other canned messages.

Both the IFF codes and the vehicle status data are transmitted to the oscillator assemblies (10 and 12) from a controller/indicator 14. The controller/indicator 14 includes a memory (not shown) containing the information to be transmitted. The controller/indicator 14 also monitors the transmitted signal detected by an RF coupler 15 and built-in test monitor 16. The RF coupler 15 and built-in test monitor 16 each monitor the transmitted signal for possible errors.

To generate the required transmission frequency tones, the oscillators of the oscillator assembly 10 are sequentially gated or turned on and off in accordance with the IFF code or data that is being transmitted. The oscillators are turned on and off by means of pin diode switches 13 responsive to the controller/indicator 14.

The tone frequencies generated within the dielectric resonator oscillator assembly 10 are transmitted over parallel channels 22 to a power combiner 24. Within the power combiner 24, the frequency tones are summed to a single output composite waveform signal. The waveform signal will be discussed in more detail later. The composite signal is amplified by an amplifier 26 and filtered through a band-pass filter 28 for transmission by an antenna 18. The antenna 18 has a near omni-directional transmission pattern.

The broad antenna pattern and power level of less than one watt of the transmitter of FIG. 2 results in a low level effective radiated power (ERP) from the transmitter. This low power level together with the uncertainty of the generated channel frequencies results in a transmitted signal that has a low probability of intercept by hostile forces.

Figure 3:
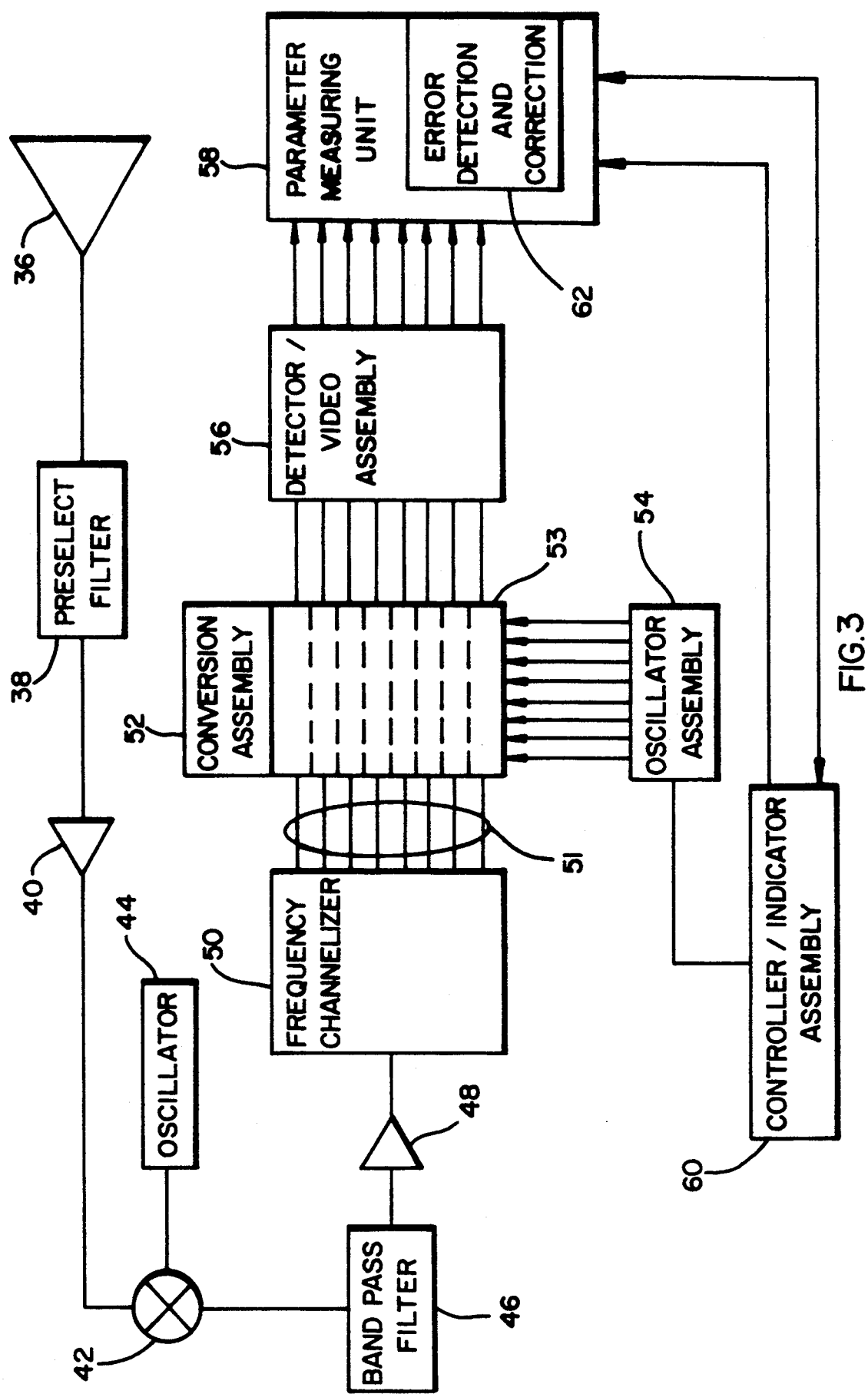
FIG. 3 is a block diagram illustrating one embodiment of a receiver of the present invention.

Referring now to FIG. 3, there is shown a block diagram of a receiver of the present invention. Vehicles (close support aircraft, helicopters, and armored ground vehicles) capable of attack are equipped with such a receiver. A directional receiving antenna 36 is aligned to cover the potential strike envelope of the attacking vehicle. For example, on an armored tank the antenna would be mounted on the turret and aligned with the rangefinder or gunsight of the tank. Connected to the antenna 36 is a preselect filter 38 for band limiting the incoming RF frequency. The signal passes through a low-noise amplifier 40 to establish the receiver noise figure. The signal is down converted using low side mixing in a mixer 42. The mixer 42 is injected with a oscillator injection signal from an oscillator 44 such that an output signal of the mixer in the 2–4 GHz intermediate frequency range is produced. This down-converted signal is filtered through a band-pass filter 46 to remove noise components outside of the 2–4 GHz range and the filtered signal is amplified at an amplifier 48 for transmission to the frequency channelizer 50.

The frequency channelizer 50 breaks out the frequency tones originally generated by the oscillator assembly 10 of the EHF transmitter. Each frequency tone is passed over parallel channels 51 to a converter assembly 52. The second converter assembly 52 utilizes separate mixers 53 for each tone frequency and down converts the signal to a second IF frequency by means of injected oscillator signals from oscillator assembly 54. Since the exact frequency of each tone will vary from transmitter to transmitter, each injected oscillator signal is swept in a sawtooth manner to cover this uncertainty in frequency. Following the converter assembly 52 is a detector/video assembly 56 for establishing the values of the recovered frequency tones.

Connected to the detector/video assembly 56 is a parameter measuring unit 58. The parameter measuring unit 58 compares the received waveform signal with the correct IFF code stored in the memory of a controller/indicator assembly 60. The parameter measuring unit 58 also contains an error detection and correction circuit 62 allowing one or more of the frequency tones to be missed or incorrect without generating a non-match signal. The controller/indicator assembly 60 provides means for setting the IFF code and also provides an indication of the results of the comparison made by the parameter measuring unit 58.

Figure 4A:
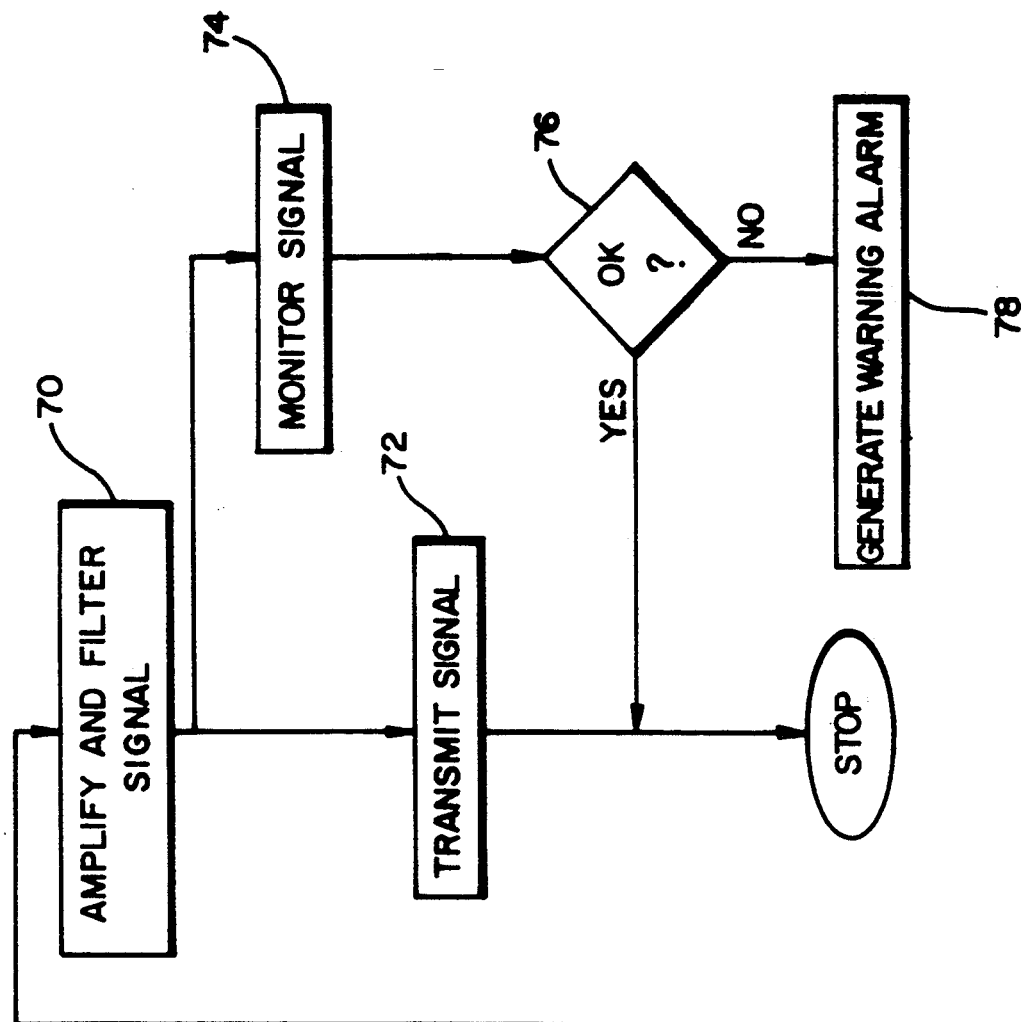
FIG. 4 is a flow diagram illustrating the IFF mode of operation of the present invention.
Figure 4A:
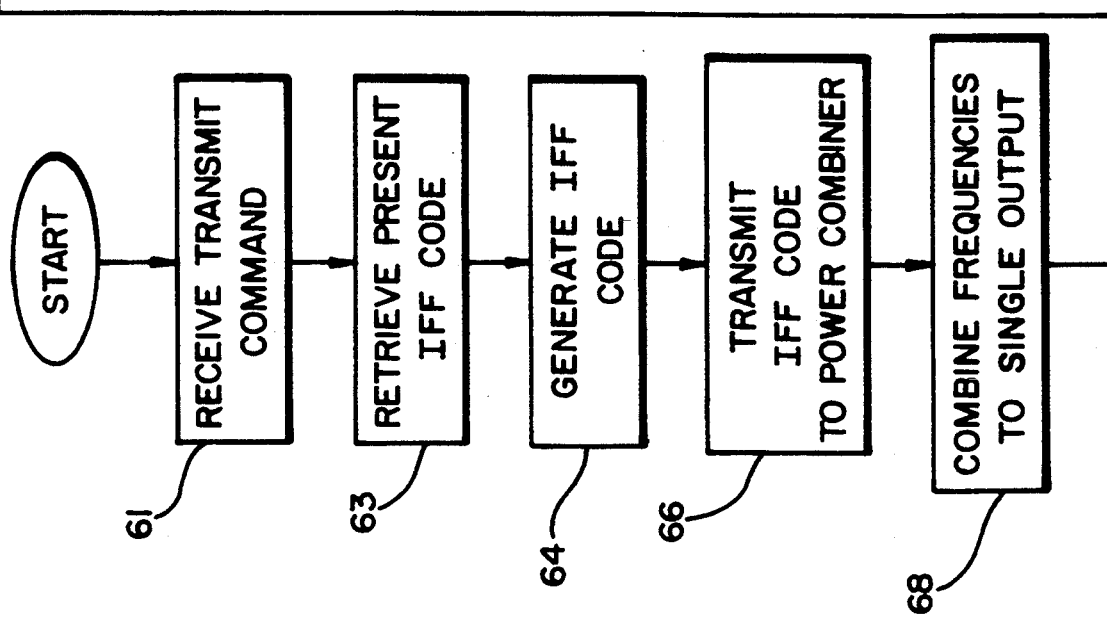
Figure 4B:
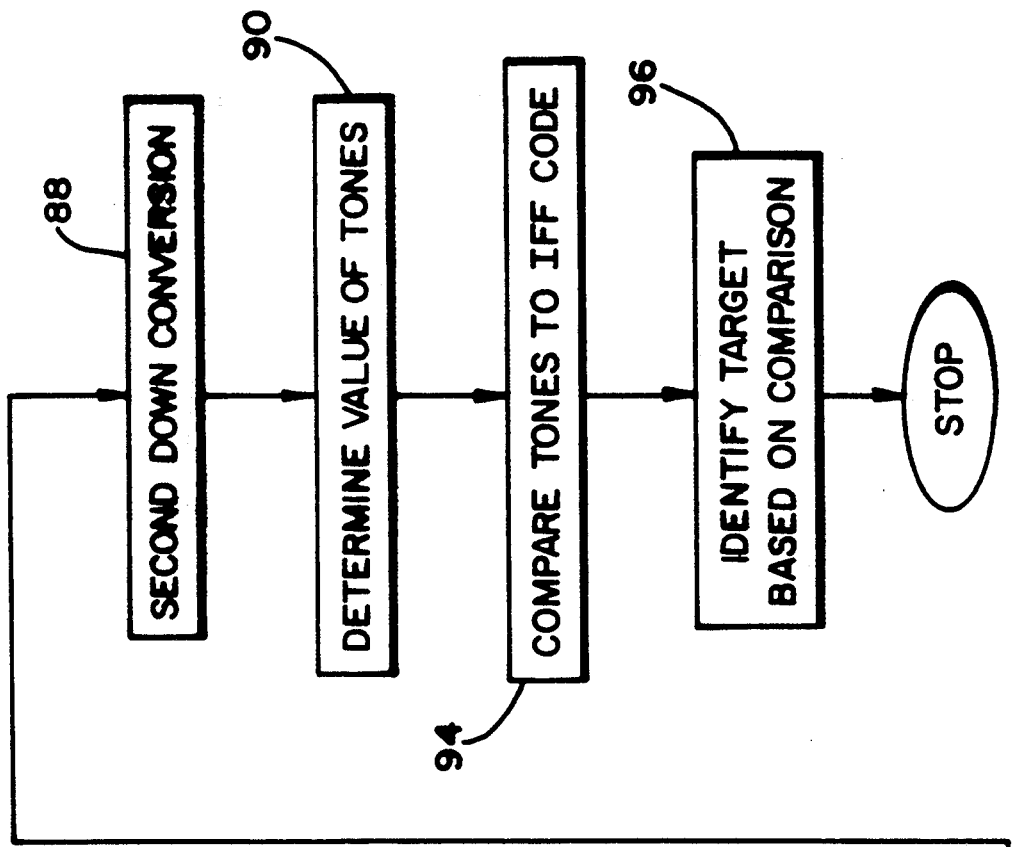
Figure 4B:
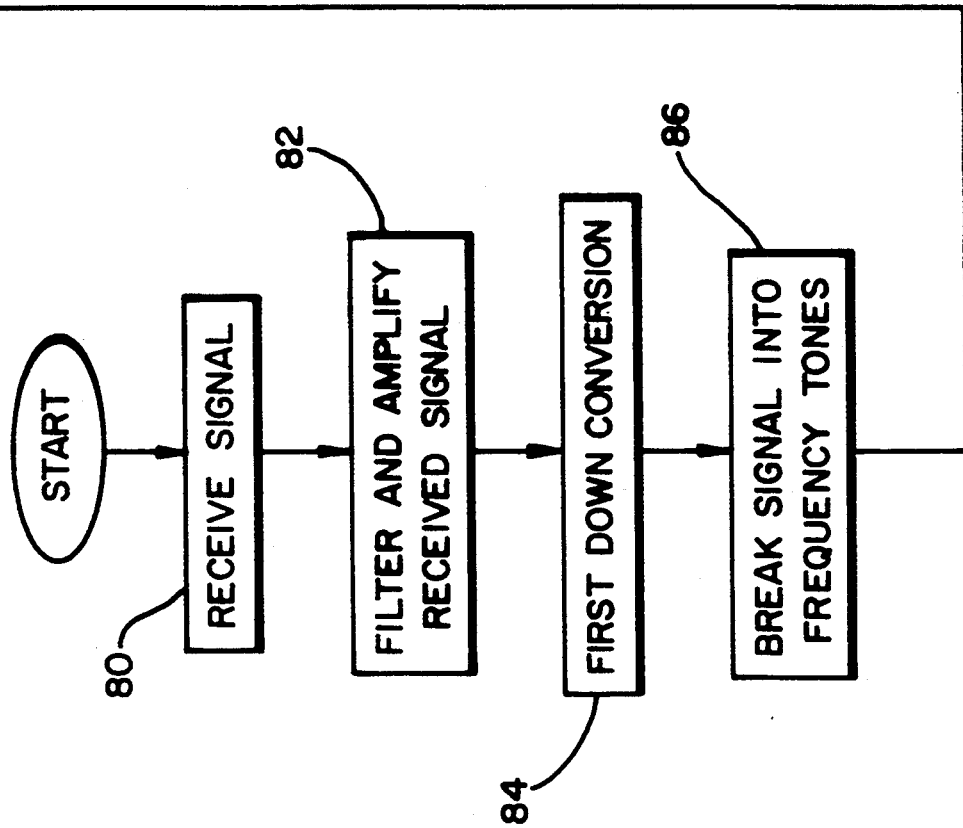

Operation in the IFF mode of the invention is illustrated in FIGS. 4a and 4b. It is noted that the system operates in one of three IFF modes. In the first mode, the transmitter provides a repetitive transmission of the low-data rate frequency hopped IFF waveform. The second mode of transmission is a blinking mode in which transmitted waveforms are staggered in time in an irregular manner. The final IFF mode only transmits the IFF code when the transmitter is triggered by some external means such as an optical or RF warning receiver.

For purposes of the description in FIGS. 4a and 4b, it is not relevant which IFF mode is being used. Referring to FIG. 4a, there is shown the procedure for transmitting the IFF signal. When a transmit command is received at step 61 from the control/indicator assembly 60, the present IFF code is retrieved at step 63 from the memory of the controller/indicator assembly 60. The IFF code is generated at step 64 by the oscillator assembly 10 by switching the pin diode switches 13 on and off as indicated by the IFF code of the day. The generated frequency tones are combined at step 68 into a single output composite waveform which is amplified and filtered at step 70 to reduce unwanted noise and spurious signal components. The signal is transmitted at step 72.

During signal transmission, the signal is monitored at step 74 to determine if the proper signal is being transmitted. If it is determined at inquiry step 76 that the proper signal is not being transmitted, the built-in test circuitry provides a warning indication at step 78 to the control indicator assembly.

Referring now to FIG. 4b, the process for receiving the transmitted IFF code is illustrated. At step 80, the transmitted signal is received by the multi-channel receiver. The signal is filtered by a preselect filter 38 and amplified at step 82 by an amplifier 40 to band limit the incoming RF energy and establish the receiver noise figure. The signal then goes through a first down conversion at step 84 where the conversion assembly 58 mixes the signal with an injected oscillator signal from the oscillator 44 to convert the received signal to a lower IF frequency. The frequency channelizer 50 breaks the signal into the frequency tones at step 86 representing the IFF code that was originally generated by the transmitter of FIG. 2 at a transmitting vehicle. The frequency tones individually go through a second down conversion at step 90 and are passed through a detector video assembly 56 to determine the values of the received frequency tones at step 92.

These detected frequency tone values are compared at step 94 by the parameter measuring unit 58 to the correct IFF code to determine if the signal matches the IFF code. The transmitting vehicle is then identified at step 96 as a friend or foe by the controller/indicator assembly 60 based upon the results of the comparison.

Figure 5A:
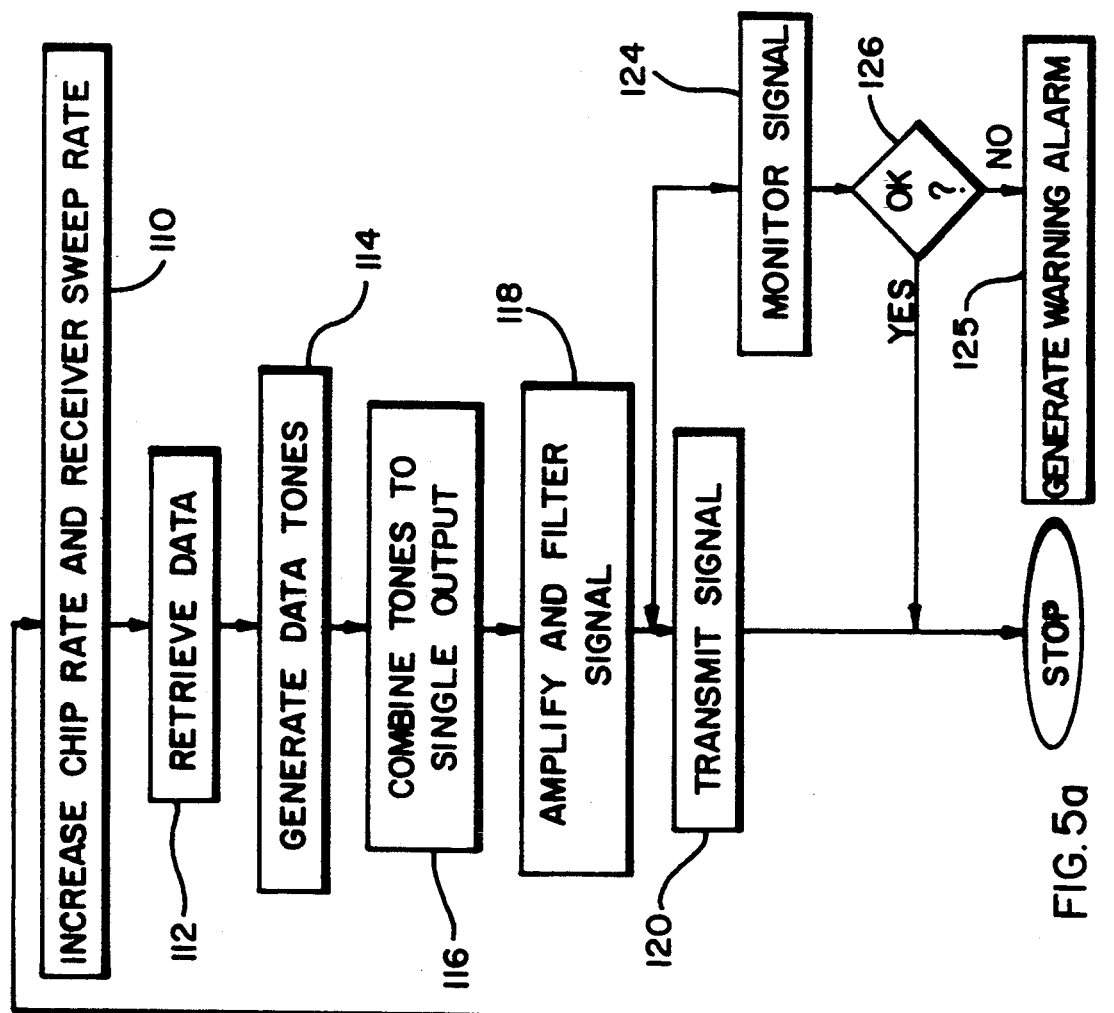
FIG. 5 is a flow diagram illustrating the data communication mode of operation of the present invention.
Figure 5A:
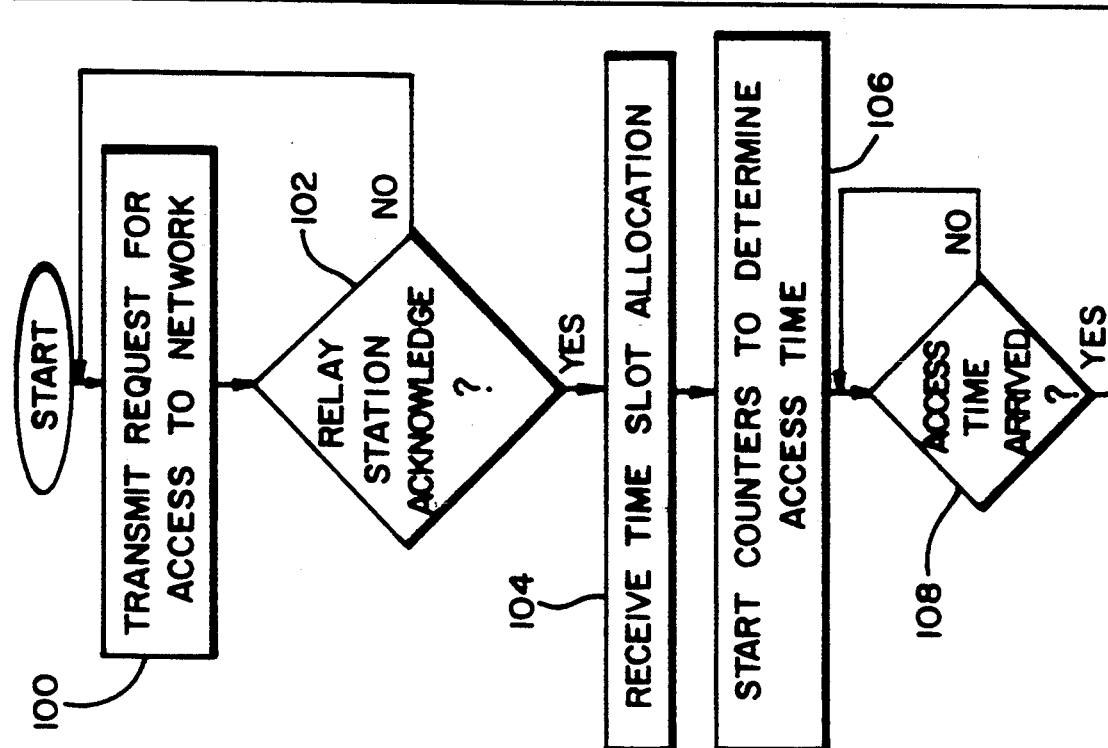
Figure 5B:
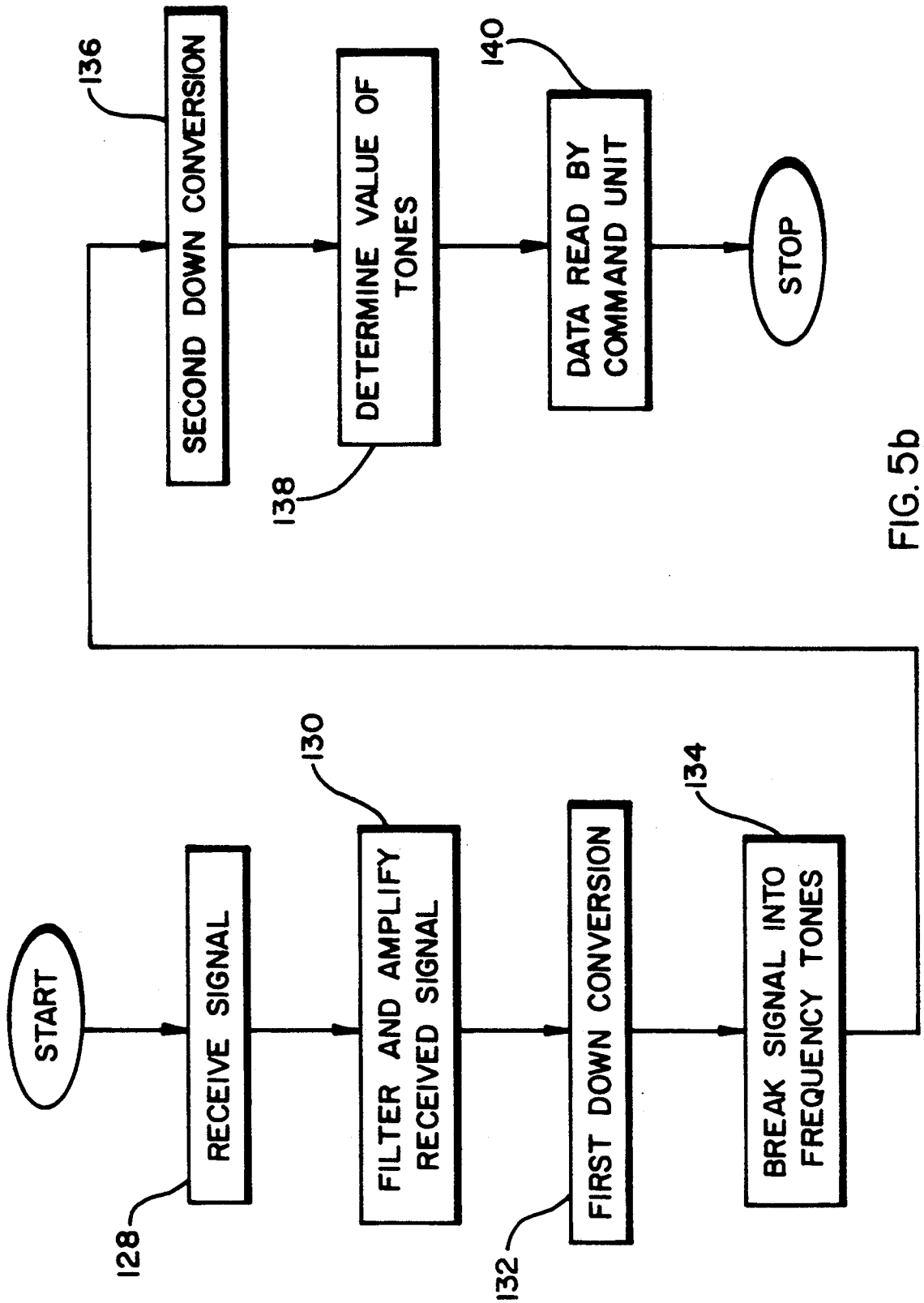

Referring now to FIGS. 5a and 5b, there is shown a flow diagram of the data communications mode of the present system. Referring to FIG. 5a, there is shown the process for data transmission in the communications mode. To begin data transmission, the transmitter of FIG. 2 transmits at step 100 to the relay unit 6 a request for access to the TDMA network. If a determination is made at inquiry step 102 that the relay unit has not acknowledged the request for access, the system returns to step 100 and continues to request access to the network.

If the relay unit 6 acknowledges the ground unit request at step 102, the ground unit receives at step 104 a time slot allocation. The time slot allocation represents the time period in which data may be transferred between the ground unit and the relay unit 6. Upon receipt of its time allocation slot, the controller/indicator 14 within the transmitter starts counters at step 106 measuring the time until the transmitter may access the relay unit 6. This type of relative time slot addressing in which the timing of the access period begins when the ground vehicle receives its access time allows the system to operate without the absolute timing required by present TDMA networks. The controller/indicator 60 determines at inquiry step 108 if the access time for the transmitter has arrived. If the access time has not arrived, the unit will continue to monitor for the correct access time at step 108. When the correct access time arrives, the chip rate of the transmitter and the receiver sweep rate are increased at step 110 to increase the amount of data transmitted with each waveform.

The data to be transmitted is then retrieved at step 112 from the controller/indicator 60. The frequency tones representing the data are then generated at step 114 by the oscillator assembly 12. The frequency tones are passed at step 116 to the power combiner 24 for summation to form a signal output and are amplified and filtered at step 118. The data is then transmitted at step 120. During signal transmission, the signal is monitored at step 124 by the built-in test monitor 24 to determine if the proper signal is being transmitted. If it is determined at inquiry step 126 that the proper signal is not being transmitted, a warning indicator is provided at step 125 to the control indicator assembly.

Referring to FIG. 5b, there is shown the process for data reception in the communication mode. At step 128, the transmitted signal is received by the frequency swept multi-channel receiver. The signal is filtered and amplified at step 130 to band limit the incoming RF energy and establish the receiver noise figure. The signal then goes through a first conversion at step 132 where the mixer 42 mixes the received signal with an injected oscillator signal from the oscillator 44 to convert the received signal to a lower IF frequency. At step 134, the signal is broken into the frequency tones representing the data signal originally generated at the transmitting station by the frequency channelizer 50. The frequency tones individually go through a second conversion at step 136 in the conversion assembly 52 and are passed through a detector/video assembly 56 at step 138 to determine the values of the received frequency tones. The data is then read and interpreted at step 140 by the command unit 8.

Figure 6:
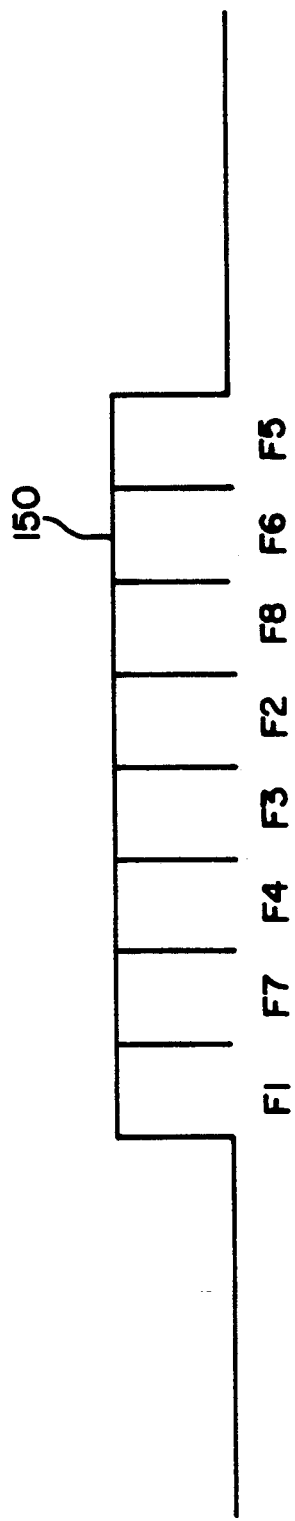
FIG. 6 is an illustration of a transmitted waveform of the present invention.

Referring to FIG. 6, there is illustrated the waveformsignal generated by the transmitter. The waveform contains eight chips 150 representing the eight frequency tones generated by the oscillator assembly. The number of chips may vary depending upon the number of channels within the transmitter and receiver. Each of the chips 150 represents a frequency tone corresponding to part of the IFF code or the data representing vehicle status information. In the data communications mode of operation, the chip rate is increased such that a greater number of chips fit within any single composite waveform thus allowing a greater amount of data to be transmitted.

Figure 7:
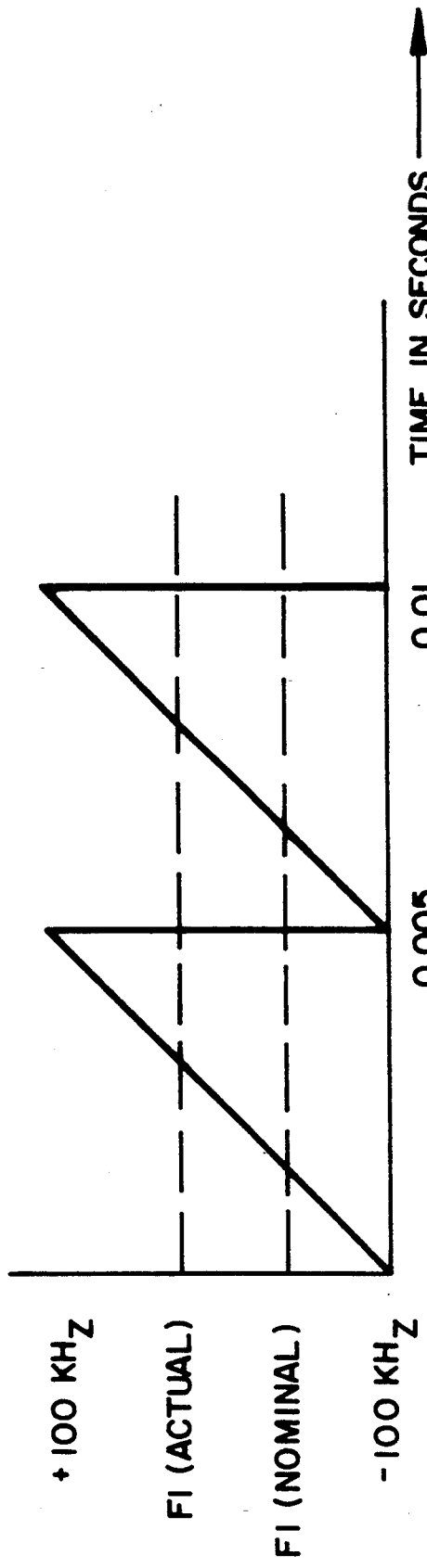
FIG. 7 is an illustration of a receiver channel frequency sweep of the present invention.

Referring now to FIG. 7, there is illustrated the receiver frequency sweep for one channel of the frequency channelizer. The sweep rate for final conversion must be compatible with the time that one frequency is transmitted (chip length) and the receiver band pass. For example, if the sweep rate is 200 sweeps per second (0.005 sec. sweep length) and each chip length is 0.01 seconds, then a chip would be present during at least two complete frequency scans.

Although FIG. 7 shows no dead time between sweeps, a dead time between alternate sweeps could be added to ensure that the chip does not straddle adjacent sweeps during both sample time periods. During the data communications mode of operation of the receiver, the frequency sweep rate is increased to match increased chip length rate such that at least one scan of the received frequency chips may be achieved.

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

I claim:

1. A vehicle communication and identification system having an IFF mode of operation and a data communications mode of operation, said system comprising:
    a multi-channel, extremely high frequency transmitter having an IFF mode of operation and a data communication mode of operation, said transmitter including:
        first means for generating an IFF code sequence signal;
        second means for generating a communications signal;
        control means for selectively actuating the IFF mode or the communications mode, said control means further providing IFF codes and communications data to said first and second means respectively; and
    a receiver for receiving the transmitted IFF code sequence signal and the transmitted communications signal.

2. The system of claim 1, wherein said transmitter further comprises:
    an omni-directional antenna for transmitting the IFF code sequence signal and the communications signal at a low effective radiated power.

3. The system of claim 1 wherein said transmitter further includes:
    a plurality of oscillators within each of the first and second means, each oscillator having an output frequency distinctive of any of the other oscillators; and
    switching means, responsive to the control means for selectively actuating the plurality of oscillators within the first and second means.

4. The system of claim 2, further comprising:
    an RF coupler, coupled to the omni-directional antenna, for monitoring IFF code sequence signal and the communications signal; and
    a test monitor for detecting errors in the IFF code sequence signal and the communications signal.

5. The system of claim 1, wherein said receiver comprises:
    a narrow beam width antenna for receiving RF signals from a transmitting vehicle;
    a preselector filter for band limiting the incoming RF signal;
    a mixer for down converting the RF signal;
    a channelizer for separating the down converted RF signal into separate frequency tones;
    detector means for determining the value of the frequency tones;
    a parameter measuring means for comparing the values of the frequency tones with a stored preselected code; and
    a controller for setting the preselected code compared with the determined frequency tones, said controller further including means for indicating the results of the comparison in said parameter measuring means.

6. The system of claim 1, wherein the control means includes means for actuating said first and second means to generate a low maximum effective radiated power to substantially prevent detection of transmitted signals from other than a desired receiver.

7. The system of claim 1, wherein the transmitter further includes means for operating the transmitter in a repetitive mode for continuous transmission of the IFF code sequence signal.

8. The system of claim 1, wherein the transmitter further includes means for operating the transmitter in a blinking mode for staggered transmission of the IFF code sequence signal.

9. The system of claim 1, wherein the transmitter further includes means for operating the transmitter in a triggering mode for transmission of the IFF code sequence signal in response to an external trigger.

10. A method for identifying a ground vehicle comprising the steps of:
    generating a plurality of frequency tones representing an extremely high frequency IFF code signal, said signal having a low effective radiated power to minimize undesired reception of the signal;
    combining the frequency tones into a single output signal;
    transmitting the output signal;
    receiving the output signal at a multi-channel, multi-conversion extremely high frequency receiver;
    separating the received output signal into the plurality of frequency tones representing the IFF code signal;
    determining a value for each. Of the plurality of frequency tones;
    comparing the value of the frequency tones to a correct IFF code; and
    determining an identity of the ground vehicle based on the results of the comparison.

11. A method for communicating between ground vehicles with IFF equipment on a time slot access network, comprising the steps of:
    requesting access to the network from a ground vehicle;
    acknowledging the ground vehicle request, said acknowledgement including an assigned access time;
    tracking time until arrival of the assigned access time;
    transmitting an extremely high frequency data signal to a receiver during the assigned access time, the step of transmitting further including the steps of:
        generating a plurality of frequency tones representing the data to be transmitted;
        combining the frequency tones into a single output signal;
    receiving the output signal at a multi-channel/multi-conversion extremely high frequency receiver;
    separating the received output signal into the plurality of frequency tones;

determining the value of each of the retrieved frequency tones; and transferring the values of the frequency tones to a controller for processing.

12. The method of claim 11, further including the steps of:

down-converting the output signal to an IF frequency; and down-converting each frequency tone to a second IF frequency.

13. A transmitter having an IFF mode of operation and a data communications mode of operation, said transmitter comprising:

first oscillator means for generating a plurality of distinctive frequency tones representing an IFF code sequence signal;

second oscillator means for generating a plurality of distinctive frequency tones representing a communications signal;

a power combiner, coupled to the first and second oscillator means for combining the plurality of frequency tones into a single output signal; and control means for selectively actuating the IFF mode or the communications mode, said control means further providing IFF codes and communications data to said first and second oscillator means respectively.

14. The transmitter of claim 13, wherein said first oscillator means further comprises:

a plurality of oscillators each generating a distinctive frequency; and first switching means for selectively actuating the plurality of oscillators within the first oscillator means to generate the plurality of frequency tones representing the IFF code sequence signal.

15. The transmitter of claim 13, wherein said second oscillator means further comprises:

a plurality of oscillators; and second switching means for selectively actuating the second oscillator means to generate the plurality of frequency tones representing the communications signal.

16. A receiver for receiving IFF code sequence signal and communications signals, comprising:

a narrow beam antenna for receiving RF signals from a transmitting vehicle;

a channelizer for separating the received RF signals into separate frequency tones;

a detector video assembly for determining a value of the frequency tones;

parameter measuring means for comparing the value of the frequency tones with a stored preselected code; and a controller for setting the preselected code compared with the determined values of the frequency tones, said controller further including means for indicating the results of the comparison in the parameter measuring means.

* * * * *